United States Patent
Kitani

(10) Patent No.: US 10,623,610 B2
(45) Date of Patent: Apr. 14, 2020

(54) DISPLAY PROCESSING DEVICE AND DISPLAY PROCESSING METHOD

(71) Applicant: DENSO CORPORATION, Kariya, Aichi-pref. (JP)

(72) Inventor: Hiroki Kitani, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/075,871

(22) PCT Filed: Feb. 6, 2017

(86) PCT No.: PCT/JP2017/004153
§ 371 (c)(1),
(2) Date: Aug. 6, 2018

(87) PCT Pub. No.: WO2017/138473
PCT Pub. Date: Aug. 17, 2017

(65) Prior Publication Data
US 2019/0045092 A1   Feb. 7, 2019

(30) Foreign Application Priority Data

Feb. 8, 2016   (JP) .................................. 2016-021848

(51) Int. Cl.
*H04N 5/225* (2006.01)
*B60R 1/00* (2006.01)
(Continued)

(52) U.S. Cl.
CPC ............... *H04N 5/225* (2013.01); *B60R 1/00* (2013.01); *G06F 3/0416* (2013.01);
(Continued)

(58) Field of Classification Search
None
See application file for complete search history.

(56) References Cited

U.S. PATENT DOCUMENTS 7,161,616 B1    1/2007  Okamoto et al.
10,127,472 B2 * 11/2018 Enami .................... G01J 1/0242
(Continued)

FOREIGN PATENT DOCUMENTS

JP    2009-239674        10/2009
JP    2012-124610 A      6/2012
(Continued)

*Primary Examiner* — Jefferey F Harold
*Assistant Examiner* — Mustafizur Rahman
(74) *Attorney, Agent, or Firm* — Knobbe, Martens, Olson & Bear, LLP

(57) ABSTRACT

A display processing device includes a moving image generation unit, a display control unit, and an input detection unit. The moving image generation unit generates a combined moving image that is a moving image combined from a plurality of moving images. The input detection unit detects an input operation performed on the input device that receives the input operation for inputting at least one of a position on the combined moving image displayed on a display device and a direction based on the combined moving image. The display control unit allows the display device to display a moving image that is based on, among the plurality of moving images constituting the combined moving image, one or more moving images according to the input detected by the input detection unit, and that has a display mode different from at least the combined moving image.

6 Claims, 8 Drawing Sheets

(51) Int. Cl.
    *G06F 3/041*        (2006.01)
    *G06F 3/0488*      (2013.01)
    *H04N 7/18*         (2006.01)
    *H04N 5/232*       (2006.01)

(52) U.S. Cl.
    CPC ...... *G06F 3/04883* (2013.01); *G06F 3/04886* (2013.01); *H04N 5/23216* (2013.01); *H04N 5/23238* (2013.01); *H04N 5/23293* (2013.01); *H04N 7/181* (2013.01); *B60R 2300/303* (2013.01)

(56) References Cited

U.S. PATENT DOCUMENTS

| | | | | |
|---|---|---|---|---|
| 2010/0119157 A1* | 5/2010 | Kameyama | .......... | H04N 19/115 382/195 |
| 2011/0007185 A1* | 1/2011 | Yonaha | ................ | H04N 5/2353 348/239 |
| 2011/0007186 A1* | 1/2011 | Yonaha | ................ | H04N 5/2352 348/239 |
| 2012/0032960 A1* | 2/2012 | Kameyama | ........ | H04N 7/17318 345/428 |
| 2012/0249728 A1* | 10/2012 | Kato | .................... | H04N 1/3871 348/36 |
| 2014/0198226 A1* | 7/2014 | Lee | ...................... | H04N 5/2355 348/208.1 |
| 2014/0307960 A1* | 10/2014 | Sharma | ............. | H04N 5/23229 382/162 |
| 2015/0078725 A1* | 3/2015 | Kobuse | ............ | G11B 20/00007 386/224 |
| 2016/0029021 A1* | 1/2016 | Iwata | ................... | H04N 19/172 382/233 |
| 2016/0193983 A1 | 7/2016 | Sawada | | |

FOREIGN PATENT DOCUMENTS

| | | |
|---|---|---|
| JP | 2013-109418 A | 6/2013 |
| JP | 5324722 | 10/2013 |
| JP | 2015-184839 | 10/2015 |
| JP | 2016-012895 | 1/2016 |

\* cited by examiner

DISPLAY PROCESSING DEVICE AND DISPLAY PROCESSING METHOD

CROSS-REFERENCE TO RELATED APPLICATION

This application is based on and claims the benefit of priority from earlier Japanese Patent Application No. 2016-021848 filed on Feb. 8, 2016, the disclosures of which are incorporated herein by reference.

TECHNICAL FIELD

The present disclosure relates to a technique of capturing and displaying the surroundings of a vehicle.

BACKGROUND ART

As an example of display processing, there is a well-known technique of recording moving images captured by a camera mounted in a vehicle, and reproducing the images later. For example, Patent Literature 1 (PTL 1) proposes a technique of storing still image frames that constitute moving images, associated with time and GPS coordinates.

CITATION LIST

Patent Literature

[PTL 1] JP 5324722 B

SUMMARY OF THE INVENTION

Technical Problem

When moving images are simultaneously captured by a plurality of cameras mounted in a vehicle, there is a plurality of related moving images. When these moving images are reproduced, a possible method is to select specific moving images (image frames) from a plurality of moving images based on file names etc., and reproduce them. According to such a method, however, it is difficult to know the contents of each moving image to be selected, and it is not likely to select the desired moving image.

An object of the present disclosure is to provide a technique that is capable of easily confirming the contents of the desired moving image.

Solution to Problem

A display processing device (7), which is one embodiment of the technique of the present disclosure, comprises a moving image generation unit (31), a display control unit (33), and an input detection unit (35).

The moving image generation unit generates a combined moving image (101, 141a, 151) that is a moving image combined from a plurality of moving images. The display control unit allows a display device (5) capable of displaying a moving image to display a moving image. The input detection unit detects an input operation performed on the input device (5) that receives the input operation for inputting at least one of a position on the combined moving image displayed on the display device and a direction based on the combined moving image.

The display control unit allows the display device to display a moving image (121, 123, 125, 127, 141b) that is based on, among the plurality of moving images constituting the combined moving image, one or more moving images according to the input detected by the input detection unit, and that has a display mode different from at least the combined moving image.

Due to the above structure, the display processing device of the present disclosure displays, from a state in which a combined moving image composed of a plurality of moving images is displayed, a moving image based on at least one moving image according to a user's operation. Therefore, the user can easily confirm the contents of the moving image that the user wants to see contained in the moving images constituting the combined moving image.

A display processing method, which is one embodiment of the technique of the present disclosure, allows an information processing device (computer) to function as a moving image generation unit (31), a display control unit (33), and an input detection unit (35). The structures of the moving image generation unit, the display control unit, and the input detection unit are the same as those of the display processing device described above.

Due to the above structure, the display processing method of the present disclosure allows the information processing device to exhibit the same functions as those of the display processing device described above.

The reference signs in the parentheses described in this section and the claims show the corresponding relationship with specific means described in embodiments explained later as one aspect. Therefore, these reference signs do not limit the technical scope of the present disclosure.

DESCRIPTION OF EMBODIMENTS

Embodiments of a display processing device, which is one aspect for implementing the technique of the present disclosure, are explained below with reference to the drawings.

[1. First Embodiment]
[1-1. Structure]

Figure 1:
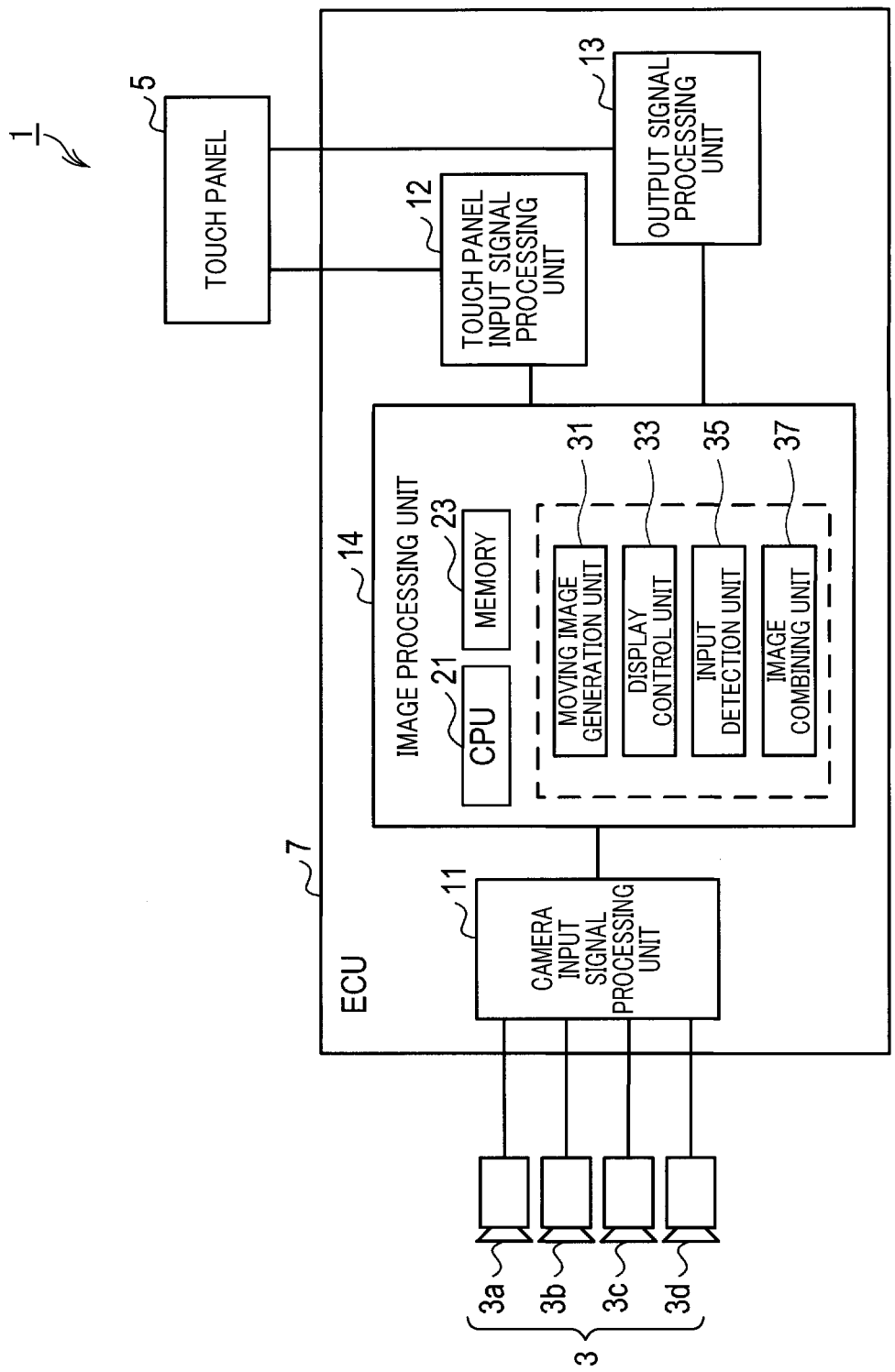
FIG. 1 is a block diagram showing the structure of a display processing system.

The display processing system 1 according to the first embodiment is mounted in a vehicle, such as an automobile, for use. As shown in FIG. 1, the display processing system 1 comprises a plurality of cameras (3a, 3b, 3c, and 3d), a touch panel 5, and an electronic control unit (hereinafter referred to as "ECU") 7, The present embodiment shows an example in which four cameras, i.e., a front camera 3a, a rear camera 3b, a left camera 3c, and a right camera 3d, are mounted. In the following explanation, when all of the four cameras are indicated, they are simply referred to as "the cameras 3." The ECU 7 corresponds to a display processing device, and is an example of an information processing device that executes a display processing method.

The display processing system 1 generates a combined moving image combined from images of the surroundings of a vehicle captured by the cameras 3, and allows the touch panel 5 to display the generated combined moving image. The display processing system 1 thereby reproduces the combined moving image of the vehicle surroundings.

The cameras 3 are imaging devices provided in the vehicle. Well-known CCD image sensors, CMOS image sensors, etc., can be used as the cameras 3. The cameras 3 capture the vehicle surroundings at predetermined time intervals (e.g., 1/15 sec), and output the captured images to the ECU 7. The front camera 3a, the rear camera 3b, the left camera 3c, and the right camera 3d are arranged so as to capture the front, rear, left, and right of the vehicle, respectively.

The touch panel 5 is a touch panel device having a display device and an input device. The display device is a device having a display screen capable of displaying images, such as a liquid crystal or an organic EL display. The input device comprises a user interface (UI) that receives an input operation from a user. Since the input device according to the present embodiment can transmit light, for example, it can be laminated on the display screen. In the touch panel 5, the display device displays an image based on a signal output from the ECU 7. Moreover, the touch panel 5 receives a user's input operation performed on the input device, and outputs an input signal to the ECU 7. The touch panel 5 corresponds to a display device and an input device.

The ECU 7 has a camera input signal processing unit 11, a touch panel input signal processing unit 12, an output signal processing unit 13, and an image processing unit 14.

The camera input signal processing unit 11 converts analog signals of the captured images input from the cameras 3 into digital signals, and outputs the digital signals to the image processing unit 14.

The touch panel input signal processing unit 12 converts an input signal input from the touch panel 5 into a digital signal, and outputs the digital signal to the image processing unit 14.

The output signal processing unit 13 converts the digital signal of the image data output from the image processing unit 14 into an analog signal, and outputs the analog signal to the touch panel 5. The touch panel 5 displays an image on the display device based on the output signal from the output signal processing unit 13.

The image processing unit 14 comprises a microcomputer having a CPU 21 and a semiconductor memory (hereinafter referred to as "memory") 23, such as RAM, ROM, or flash memory, and is mainly composed of the microcomputer. The image processing unit 14 has the functions of the moving image generation unit 31, the display control unit 33, the input detection unit 35, and the image combining unit 37. The functions of the image processing unit 14 are implemented in such a manner that the CPU 21 executes, for example, a program stored in a recording medium. The memory 23 stores, for example, input data (moving image data) from the camera input signal processing unit 11, and the stored data is used to generate a combined moving image and an individual moving image, described later. In the present embodiment, the memory 23 corresponds to the recording medium storing programs. Moreover, in the present embodiment, a display processing method is performed by executing the program.

The number of microcomputers that constitute the image processing unit 14 may be one or multiple. The method of implementing the functions of the image processing unit 14 is not limited to a method using software, such as program execution. As another implementation method, some or all of the functions of the image processing unit 14 may be implemented using hardware in combination with a logic circuit, an analog circuit, etc.

The moving image generation unit 31 generates a combined moving image that is a moving image combined from at least a plurality of moving images. The combined moving image may be generated by combining only a plurality of moving images, or may contain images other than moving images.

In the present embodiment, the moving image means an image that is composed of a plurality of still images and that can express motion depending on changes in the still images by continuously switching the plurality of still images. The combined moving image means a moving image composed of a plurality of still images newly generated by combining still images contained in a plurality of moving images. The plurality of moving images that constitute the combined moving image may be moving images stored in the memory 23 that have been captured by the cameras 3 in the past, or moving images being captured by the cameras 3.

The display control unit 33 outputs a control signal showing an image to be displayed to the touch panel 5, and allows the touch panel 5 to display the moving image.

The input detection unit 35 detects a position touched (selected) by a user's finger or the like on the touch panel 5, and also detects changes in the position. That is, the input detection unit 35 detects an input operation (touch operation), such as tapping or flicking, performed on the touch panel 5. The input detection unit 35 thereby detects an input operation for inputting at least one of a position on the combined moving image displayed on the touch panel 5 and a direction based on the combined moving image.

In the present embodiment, the touch panel 5 specifies the touched position in the X-Y coordinates (two-dimensional coordinates) in the regions of 0≤X≤240 and 0≤Y≤360. In the following explanation, the touched position is also referred to as the touch coordinates.

The image combining unit 37 combines, among a plurality of moving images constituting the combined moving image (four moving images captured by the front camera 3a, the rear camera 3b, the left camera 3c, and the right camera 3d), two or more moving images specified on the basis of the input (the input operation on the touch panel 5) detected by the input detection unit 35.

Moreover, the display control unit 33 allows the touch panel 5 to display a moving image in a display mode different from at least the above combined moving image (hereinafter referred to as "individual moving image").

The individual moving image is a moving image based on one or more moving images, which are some of the plurality of moving images constituting the combined moving image, according to the input detected by the input detection unit 35. The moving image based on one or more moving images as mentioned herein refers to a moving image using one or more moving images as materials. Specific examples thereof include moving images themselves serving as materials, moving images that have been subjected to predetermined image processing, such as shift of viewpoints of moving images serving as materials and combining of a plurality of moving images. In the present embodiment, the individual moving images include moving images captured by the four cameras 3 (the front camera 3a, the rear camera 3b, the left camera 3c. and the right camera 3d), and moving images combined by the image combining unit 37. Therefore, in the present embodiment, the display control unit 33 allows the touch panel 5 to display an individual moving image that is based on, among the plurality of moving images constituting the combined moving image, one or more moving images according to the input detected by the input detection unit 35, and that has a display mode different from at least the above combined moving image.

[1-2. Processing]

Figure 2:
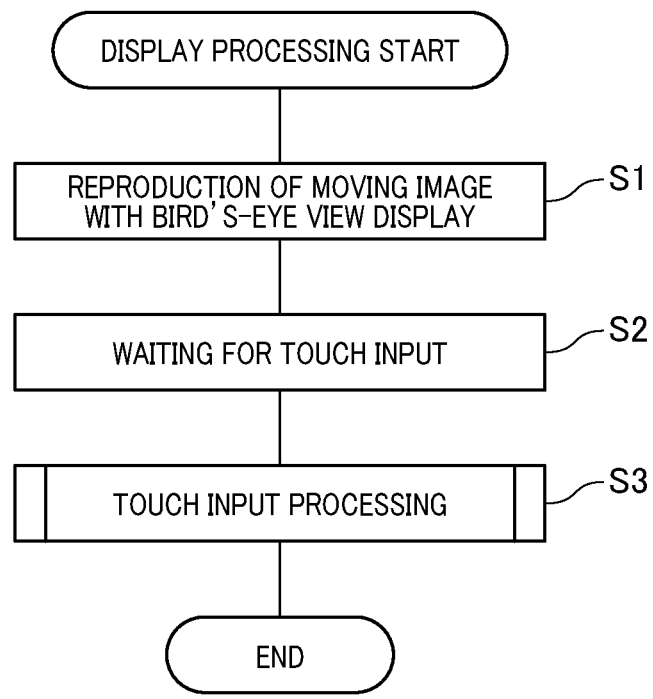
FIG. 2 is a flowchart of display processing.

Next, display processing executed by the CPU 21 of the image processing unit 14 is explained using FIG. 2.

First, the CPU 21 reproduces, in the touch panel 5, a moving image with bird's-eye view display showing the vehicle surroundings (combined moving image of the vehicle surroundings) (step S1). The moving image displayed here is explained using FIG. 3.

The combined moving image 101 of the vehicle surroundings is a moving image composed of a bird's-eye view image that looks downward to a vehicle 103, in which the display processing system 1 is mounted, with an upper part of the vehicle 103 as a viewpoint. in the present embodiment, the combined moving image 101 is combined from moving images captured by the four cameras 3 (the front camera 3a, the rear camera 3b. the left camera 3c. and the right camera 3d). That is, the combined moving image 101 is a moving image with one viewpoint combined from moving images with different viewpoints. The vehicle 103 is not captured by the cameras 3. Therefore, a previously prepared vehicle image (graphic data showing the vehicle 103) is used for the combined moving image 101.

Figure 3:
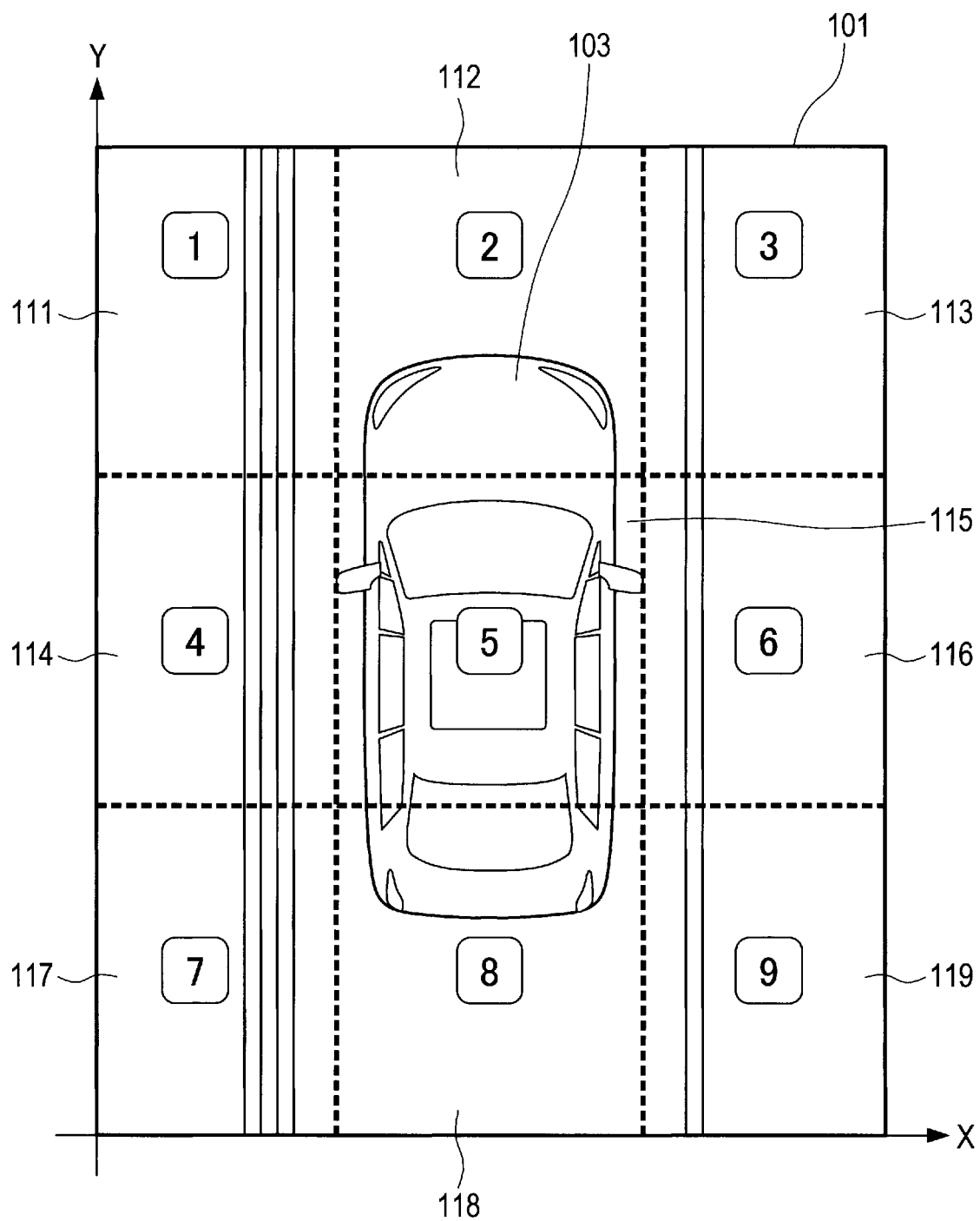
FIG. 3 shows a combined moving image of a first embodiment.

In the present embodiment, the combined moving image 101 is divided into 9 areas separated by broken lines in the X-Y coordinate space of the touch panel 5, as shown in FIG. 3. Specifically, the combined moving image 101 has a first area 111 in which the front-left of the vehicle 103 is displayed, a second area 112 in which the front center of the vehicle 103 is displayed, and a third area 113 in which the front-right of the vehicle 103 is displayed. The combined moving image 101 has a fourth area 114 in which the left of the vehicle 103 is displayed, a fifth area 115 in which the center portion of the vehicle 103 is displayed, and a sixth area 116 in which the right of the vehicle 103 is displayed. The combined moving image 101 has a seventh area 117 in which the rear-left of the vehicle 103 is displayed, an eighth area 118 in Which the rear center of the vehicle 103 is displayed, and a ninth area 119 in which the rear-right of the vehicle 103 is displayed.

Moreover, in the combined moving image 101 of the present embodiment, a plurality of moving images that constitute the combined moving image 101 (moving images with different viewpoints captured by the four cameras 3) is associated with the above areas (regions corresponding to the respective moving images are set on the combined moving image 101). Specifically, moving images captured by the front camera 3a are associated with the first area 111, the second area 112, and the third area 113. Moving images captured by the rear camera 3b are associated with the seventh area 117, the eighth area 118, and the ninth area 119. Moving images captured by the left camera 3c are associated with the first area 111, the fourth area 114, and the seventh area 117. Moving images captured by the right camera 3d are associated with the third area 113, the sixth area 116, and the ninth area 119.

Therefore, in the present embodiment, the image processing unit 14 determines the touched area according to the input operation on the touch panel 5 detected by the input detection unit 35. Then, the image processing unit 14 selects the moving image associated with the determined area based on this area.

Returning to the explanation of FIG. 2, subsequently, the CPU 21 waits until an input operation (touch input by a user) on the touch panel 5 is detected (step S2). When an input operation (touch input) is detected, control proceeds to step S3.

As a result, the CPU 21 executes touch input processing (step S3).

Figure 4:
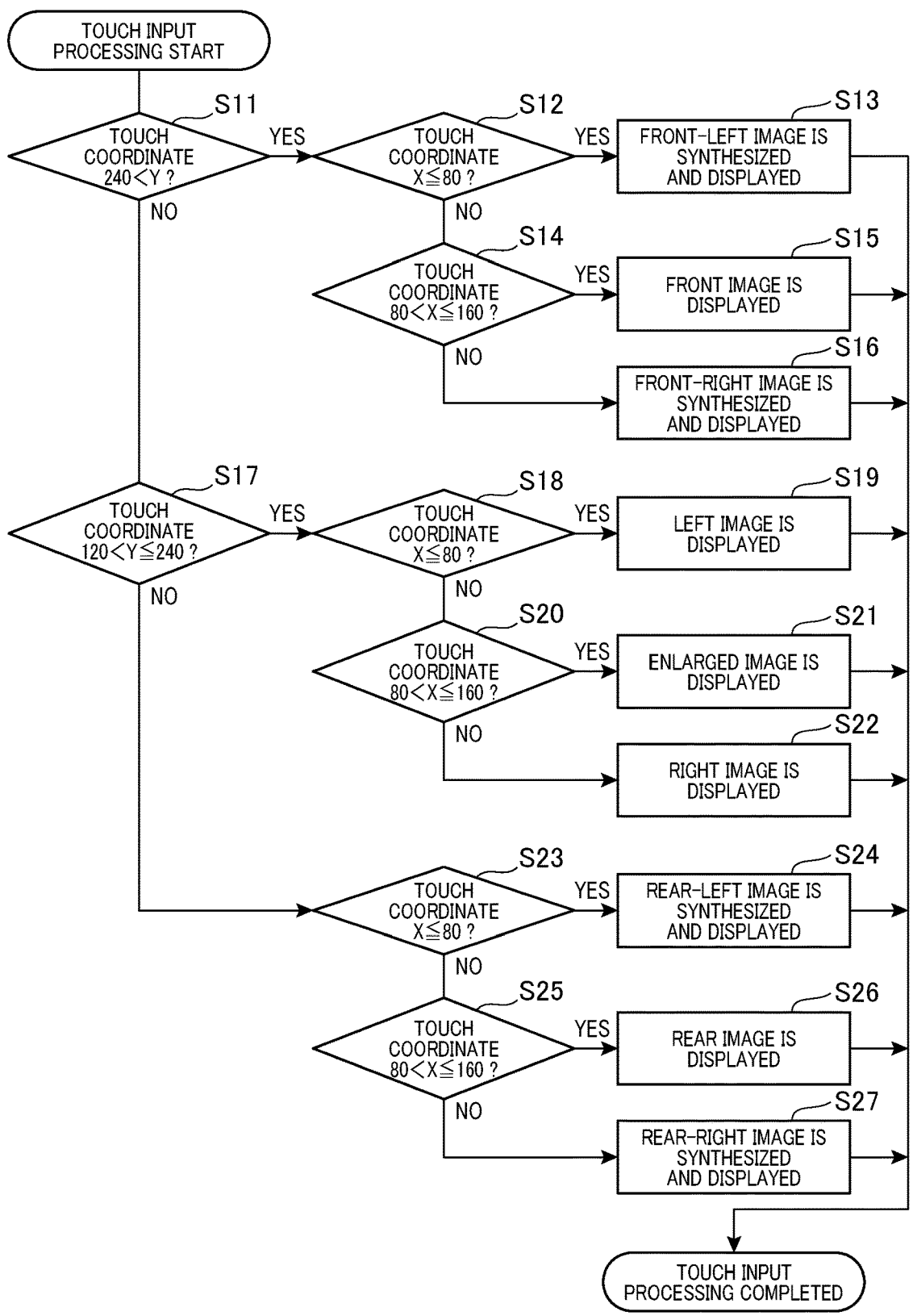
FIG. 4 is a flowchart of touch input processing.

Next, touch input processing executed by step S3 is explained using FIG. 4. This processing assumes a case in which the touch panel 5 determines the touched position as touch coordinates in the X-Y coordinates in the regions of $0 \leq X \leq 240$ and $0 \leq Y \leq 360$, as described above.

First, the CPU 21 determines whether the Y-value of the touch coordinates satisfies the conditional expression $240<Y$ (step S11). When it is determined that the Y-value satisfies the conditional expression $240<Y$ (step S11: YES), control proceeds to step S12. In contrast, when it is determined that the Y-value does not satisfy the conditional expression $240<Y$ (step 11: NO), control proceeds to step S17.

The CPU 21 determines whether the X-value of the touch coordinates satisfies the conditional expression $X \leq 80$ (step S12). When it is determined that the X-value satisfies the conditional expression $X \leq 80$ (step S12: YES), that is, when the touch coordinates are positioned in the first area 111, control proceeds to step S13. In contrast, when it is determined that the X-value does not satisfy the conditional expression $X \leq 80$ (step S12: NO), control proceeds to step S14.

Figure 5:
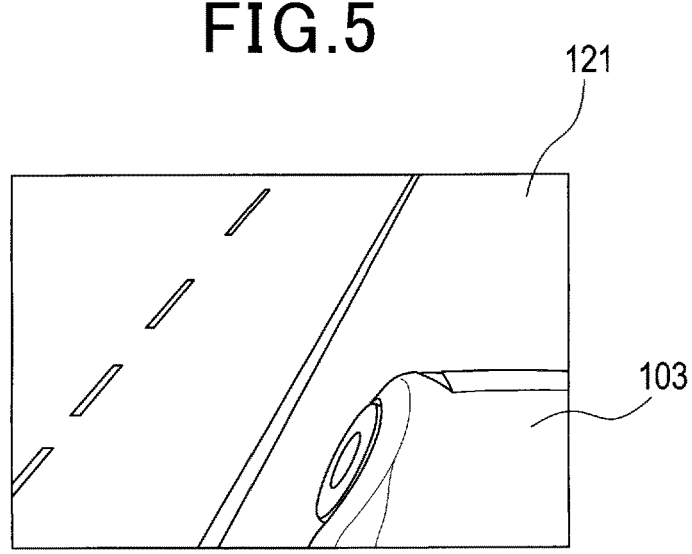
FIG. 5 is a diagram showing a front-left image.

The CPU 21 combines a front-left image, which is an example of the individual moving images, and allows the touch panel 5 to display the image (step S13). As shown in FIG. 5, the front-left image 121 is a moving image combined from moving images captured by the front camera 3a and the left camera 3c. The front-left image is a moving image corresponding to the first area 111. That is, when the first area 111 in FIG. 3 is touched (when an input operation is detected), the CPU 21 displays a moving image combined by enlarging the touched area in place of the combined moving image 101, The CPU 21 completes this processing after step S13. When this processing is completed, the CPU 21 also completes the display processing shown in FIG. 2 at the same time. The same applies to the following explanation.

The front-left image 121 may be configured to be displayed from the timing following the combined moving image 101 that has been displayed until then. Alternatively, the front-left image 121 may be configured to be displayed from the initial of the moving image or the timing before a certain period of time. The same applies to the following individual moving images.

Returning to the explanation of FIG. 4. When it is determined that the X-value does not satisfy the conditional expression $X \leq 80$ (step S12: NO), the CPU 21 determines whether the X-value of the touch coordinates satisfies the conditional expression $80<X \leq 160$ (step S14). When it is determined that the X-value satisfies the conditional expression $80<X \leq 160$ (step S14: YES), that is, when the touch coordinates are positioned in the second area 112, control proceeds to step S15. in contrast, when it is determined that the X-value does not satisfy the conditional expression 80

<X≤160 (step S14: NO), that is, when the touch coordinates are positioned in the third area 113, control proceeds to step S16.

Figure 6:
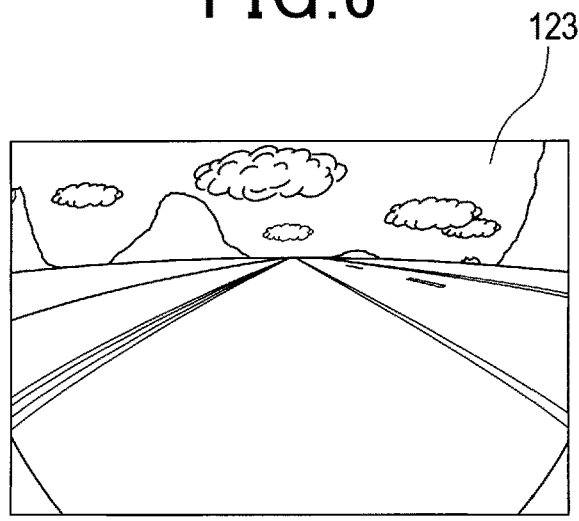
FIG. 6 is a diagram showing a front image.

The CPU 21 allows the touch panel 5 to display a front image, which is an example of the individual moving images (step S15). As shown in FIG. 6, the front image 123 is a moving image captured by the front camera 3a. The front image 123 is a moving image corresponding to the second area 112. That is, when the second area 112 in FIG. 3 is touched (when an input operation is detected), the CPU 21 enlarges the touched area, and displays a moving image showing a more forward area in place of the combined moving image 101. The CPU 21 completes this processing after step S15.

When it is determined that the X-value does not satisfy the conditional expression 80<X≤160 (step S14: NO), the CPU 21 allows the touch panel 5 to display a front-right image, which is an example of the individual moving images (step S16). The front-right image (not shown) is a moving image combined from moving images captured by the front camera 3a and the right camera 3d. The front-right image is a moving image corresponding to the third area 113. The CPU 21 completes this processing after step S16.

When it is determined that the Y-value does not satisfy the conditional expression 240<Y (step S11: No), the CPU 21 determines whether the Y-value of the touch coordinates satisfies the conditional expression 120<Y≤240 (step S17). When it is determined that the Y-value satisfies the conditional expression 120<Y≤240 (step S17: YES), control proceeds to step S18. In contrast, when it is determined that the Y-value does not satisfy the conditional expression 120<Y≤240 (step S17: NO), that is, when the Y-value is 120 or less, control proceeds to step S23.

The CPU 21 determines whether the X-value of the touch coordinates satisfies the conditional expression X≤80 (step S18). When it is determined that the X-value satisfies the conditional expression X≤80 (step S18: YES), that is, when the touch coordinates are positioned in the fourth area 114, control proceeds to step S19. In contrast, when it is determined that the X-value does not satisfy the conditional expression X≤80 (step S18: NO), control proceeds to step S20.

Figure 7:
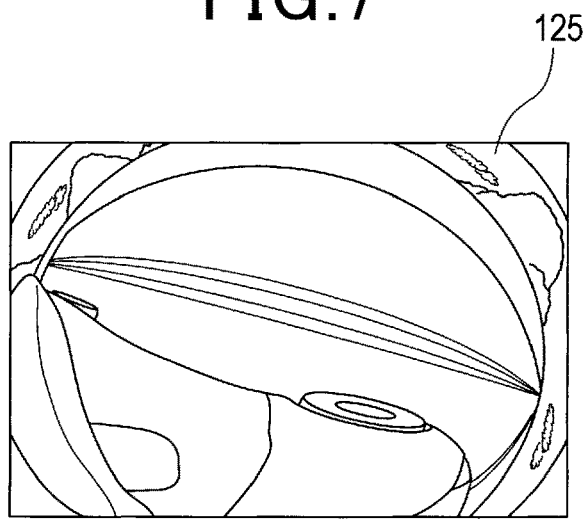
FIG. 7 is a diagram showing a left image.

The CPU 21 allows the touch panel 5 to display a left image, which is an example of the individual moving images (step S19). As shown in FIG. 7, the left image 125 is a moving image captured by the left camera 3c. The left image 125 is a moving image corresponding to the fourth area 114. That is, when the fourth area 114 in FIG. 3 is touched (when an input operation is detected), the CPU 21 displays a moving image obtained by enlarging the touched area in place of the combined moving image 101. The CPU 21 completes this processing after step S19.

When it is determined that the X-value does not satisfy the conditional expression X≤80 (step S18: NO), the CPU 21 determines whether the X-value of the touch coordinates satisfies the conditional expression 80<X≤160 (step S20). When it is determined that the X-value satisfies the conditional expression 80<X≤160 (step S20: YES), that is, when the touch coordinates are positioned in the fifth area 115, control proceeds to step S21. In contrast, when it is determined that the X-value does not satisfy the conditional expression 80<X≤160 (step S20: NO), that is, when the touch coordinates are positioned in the sixth area 116, control proceeds to step S22.

The CPU 21 displays an enlarged image, which is an example of the individual moving images (step S21). The enlarged image has the same direction of viewpoint as that of the combined moving image 101 of FIG. 3, and is a moving image showing, at a larger scale, the surroundings of the vehicle 103 further than the combined moving image 101. The CPU 21 completes this processing after step S21.

Figure 8:
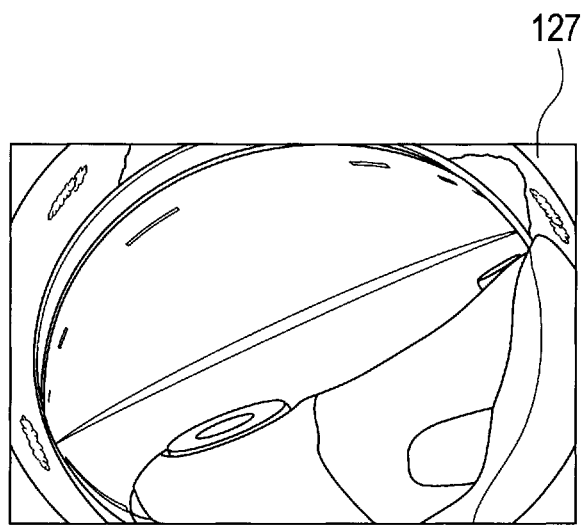
FIG. 8 is a diagram showing a right image.

When it is determined that the X-value does not satisfy the conditional expression 80<X≤160 (step S20: NO), the CPU 21 allows the touch panel 5 to display a right image, which is an example of the individual moving images (step S22). As shown in FIG. 8, the right image 127 is a moving image captured by the right camera 3d. The right image 127 is a moving image corresponding to the sixth area 116. That is, when the sixth area 116 in FIG. 3 is touched (when an input operation is detected), the CPU 21 displays a moving image obtained by enlarging the touched area in place of the combined moving image 101. The CPU 21 completes this processing after step S22.

When it is determined that the Y-value does not satisfy the conditional expression 120<Y≤240 (step S17: NO), the CPU 21 determines whether the X-value of the touch coordinates satisfies the conditional expression X≤80 (step S23). When it is determined that the X-value satisfies the conditional expression X≤80 (step S23: YES), that is, when the touch coordinates are positioned in the seventh area 117, control proceeds to step S24. In contrast, when it is determined that the X-value does not satisfy the conditional expression X≤80 (step S23: NO), control proceeds to step S25.

The CPU 21 allows the touch panel 5 to display a rear-left image, which is an example of the individual moving images (step S24). The rear-left image (not shown) is a moving image combined from moving images captured by the rear camera 3b and the left camera 3c. The rear-left image is a moving image corresponding to the seventh area 117. The CPU 21 completes this processing after step S24.

When it is determined that the X-value does not satisfy the conditional expression X≤80 (step S23: NO), the CPU 21 determines whether the X-value of the touch coordinates satisfies the conditional expression 80<X≤160 (step S25). When it is determined that the X-value satisfies the conditional expression 80<X≤160 (step S25: YES), that is, when the touch coordinates are positioned in the eighth area 118, control proceeds to step S26. In contrast, when it is determined that the X-value does not satisfy the conditional expression 80<X≤160 (step S25: NO), that is, when the touch coordinates are positioned in the ninth area 119, control proceeds to step S27.

Figure 9:
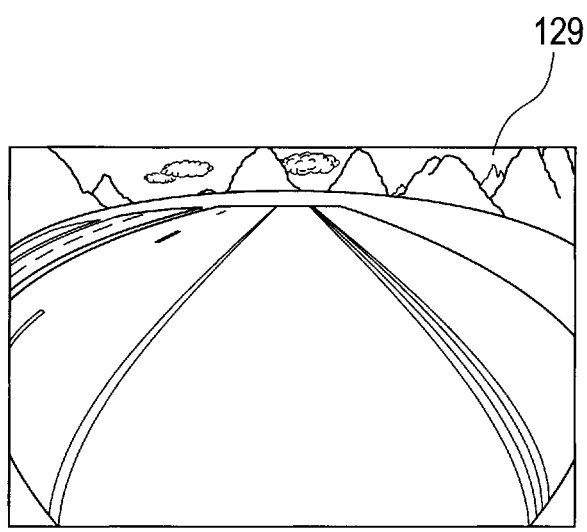
FIG. 9 is a diagram showing a rear image.

The CPU 21 allows the touch panel 5 to display a rear image, which is an example of the individual moving images (step S26). As shown in FIG. 9, the rear image 129 is a moving image captured by the rear camera 3b. The rear image 129 is a moving image corresponding to the eighth area 118. That is, when the eighth area 118 in FIG. 3 is touched (when an input operation is detected), the CPU 21 enlarges the touched area, and displays a moving image showing a more backward area in place of the combined moving image 101. The CPU 21 completes this processing after step S26.

When it is determined that the X-value does not satisfy the conditional expression 80<X≤160 (step S25: NO), the CPU 21 allows the touch panel 5 to display a rear-right image (step S27). The rear-right image (not shown) is a moving image combined from moving images captured by the rear camera 3b and the right camera 3d. The rear-right image is a moving image corresponding to the ninth area 119. The CPU 21 completes this processing after step S27.

[1-3. Effects]

The following effects can be obtained according to the first embodiment explained in detail above.

(1a) The display processing system 1 displays the combined moving image 101 composed of a plurality of moving images. The user can thereby confirm a plurality of moving images at the same time. Then, the user touches the touch panel 5 to thereby specify an area on the combined moving image 101. According to the input operation on the touch panel 5, the display processing system 1 displays an individual moving image based on some of the moving images that constitute the combined moving image 101. Therefore, the user can easily confirm the contents of the moving image that the user wants to see among the moving images constituting the combined moving image 101 at any timing by operating the touch panel 5.

(1b) Individual moving images to be displayed include a moving image combined from two of the moving images constituting the combined moving image 101. Therefore, when the touch panel 5 is operated by the user, not only the moving images constituting the combined moving image 101 are simply displayed in an enlarged scale, but also the area that the user wants to see can be displayed in a more suitable mode.

The number of moving images that constitute the individual moving image is not limited to two. For example, the individual moving image may be combined from three moving images. An individual moving image combined from three moving images is, for example, a moving image composed of a bird's-eye view image that looks downward to the vehicle 103 backward with a front upper portion of the vehicle 103 as a viewpoint.

(1c) When any position on the combined moving image 101 is touched by the user, the display processing system 1 displays an individual moving image depending on the touch coordinates, which are the detection results of the input operation on the touch panel 5. Therefore, the user can easily recognize, for example, the position of the moving image, which corresponds to the individual moving image, in the vehicle surroundings, based on the vehicle 103 displayed in the center of the combined moving image 101.

[2. Second Embodiment]

[2-1. Difference from the First Embodiment]

The basic structure of the second embodiment is the same as that of the first embodiment. Accordingly, the explanations of the common structures are omitted, and differences are mainly explained. The same reference signs as those of the first embodiment indicate the same structures, and a reference is made to the previous explanations.

The first embodiment showed a structure in which the combined moving image 101 is displayed on the touch panel 5, and when a user touches an area on the displayed combined moving image 101, the display image is changed to an individual moving image. In contrast, the second embodiment shows a structure in which the viewpoint of the combined moving image is changed according to the input operation on the touch panel 5. This point is different from the first embodiment.

Figure 10:
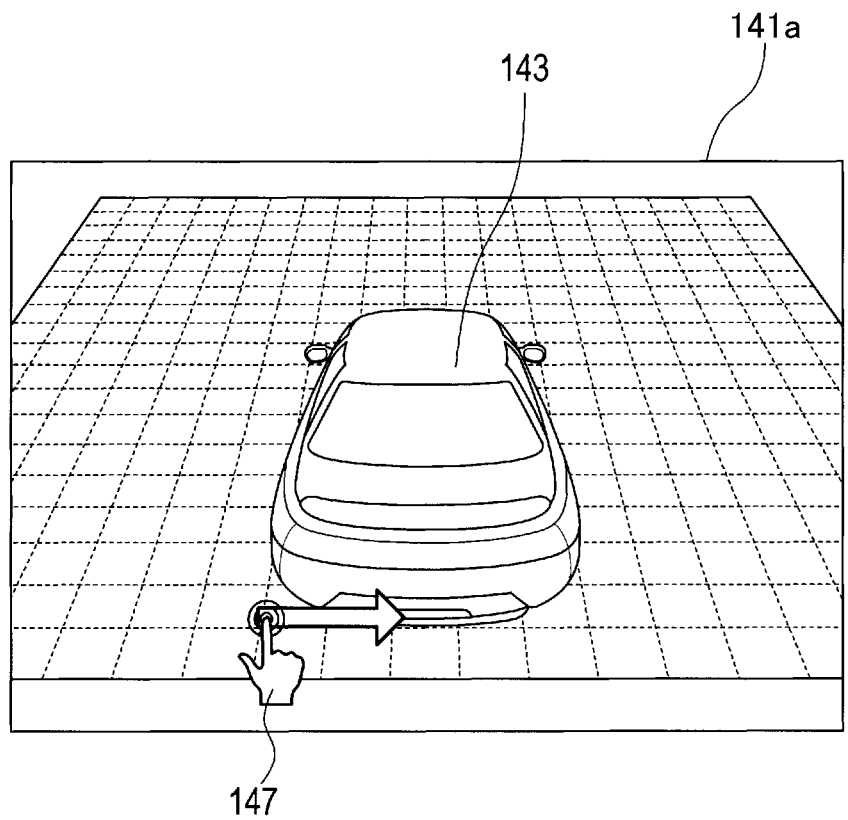
FIG. 10 is a diagram showing a combined moving image of a second embodiment.

The combined moving image of the present embodiment is, for example, a moving image as shown in FIG. 10. FIG. 10 shows an example of a three-dimensional view moving image 141*a* composed of a bird's-eye view image that looks downward to a vehicle 143, in which the display processing system 1 is mounted, obliquely backward with an upper rear portion of the vehicle 143 as a viewpoint.

In the present embodiment, the three-dimensional view moving image 141*a* is combined from moving images captured by at least three cameras (the front camera 3*a*, the left camera 3*c*, and the right camera 3*d*) or the four cameras 3. That is, the three-dimensional view moving image 141*a* is a moving image with one viewpoint combined from moving images with different viewpoints. The vehicle 143 is not captured by the cameras 3. Therefore, a previously prepared vehicle image is used for the three-dimensional view moving image 141*a*.

Figure 11:
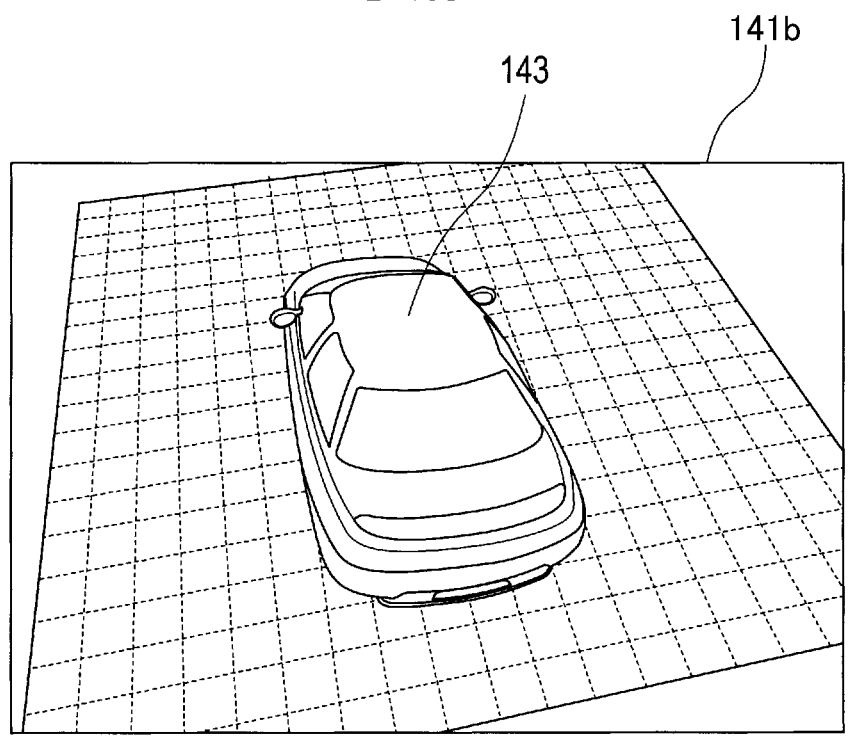
FIG. 11 is a diagram showing the combined moving image of the second embodiment in a different display mode.

In the present embodiment, a flick operation is performed on the touch panel 5 by a user's finger 147 or the like. This changes the displayed viewpoint of the three-dimensional view moving image 141*a*. That is, in the display processing system of the present embodiment, the image processing unit 14 changes the viewpoint of the three-dimensional view moving image 141*a* based on the detection results (touch coordinates, moving amount, etc.) of the input operation (flick operation) on the touch panel 5. For example, FIG. 11 shows an example of the screen of the touch panel 5 when a flick operation from left to right is performed by a user. As shown in FIG. 11, in a three-dimensional view moving image 141*b* after the input operation, the viewpoint of the display moving image is shifted to the left side relative to the three-dimensional view moving image 141*a* before the input operation, and the display mode is changed, leading to a viewpoint of looking at the vehicle 143 from the left.

Thus, in the present embodiment, the user can move the viewpoint of looking at the vehicle 143 by performing a flick operation on the touch panel 5. That is, for example, when the viewpoint of looking at the vehicle 143 is moved to an upper front portion of the vehicle 143, the viewpoint of the three-dimensional view moving image 141*a* is changed to a viewpoint of looking downward to the vehicle 143 obliquely backward from an upper front portion of the vehicle 143. The user can thereby visually recognize the rear of the vehicle 143 in the wide-angle image area. Moreover, for example, when the viewpoint of looking at the vehicle 143 is moved to the right side of the vehicle 143, the viewpoint of the three-dimensional view moving image 141*a* is changed to a viewpoint of looking at the vehicle 143 from the right side of the vehicle 143 to the left side. The user can thereby visually recognize the left side of the vehicle 143 in the wide-angle image area.

[2-2. Effects]

The following effects can be obtained according to the second embodiment explained in detail above.

(2a) The display processing system 1 changes the viewpoint of the three-dimensional view moving image 141*a* based on the detection results of the input operation on the touch panel 5. That is, the viewpoint of the three-dimensional view moving image 141*a*, which is a combined moving image displayed on the touch panel 5, can be changed by a user's flick operation. Therefore, the user can easily see a moving image in a desired direction based on the vehicle 143. Moreover, the user can easily know which direction is indicated by the display moving image based on the vehicle 143.

[3. Other Embodiments]

The embodiments for implementing the technique of the present disclosure were explained above. The technique of the present disclosure is not limited to the above embodiments. The technique of the present disclosure can be performed various modifications.

(3a) The above embodiments exemplify the touch panel 5 as an input device that receives a user's input operation, but it is not limited thereto. The input device may be a device that can receive an input operation for inputting (designating) at least one of a position on the combined moving image 101 displayed on the display device and a direction based on the combined moving image 101. The direction based on the combined moving image 101 means, for example, the vertical or horizontal direction of the combined moving image 101 based on the user when the user looks, from the front, the display screen that displays the combined moving image 101.

Examples of the input device include various devices, such as touch pads and joysticks placed apart from display devices, buttons for indicating directions, and the like.

The position on the combined moving image 101 is not limited to the touch coordinates (positional information) shown in the above embodiments. The position on the combined moving image 101 may be, for example, information showing a constant region (area). Therefore, the input device may be configured to be able to designate any of the first area 111 to the ninth area 119 for the displayed combined moving image 101.

(3b) The above embodiments exemplify a structure in which the touch panel 5 displays moving images of the surroundings of the vehicle 103 captured by the cameras 3 mounted in the vehicle 103, but it is not limited thereto. The technical structure of the present disclosure can be applied when moving images other than the moving images of the surroundings of the vehicle 103 are reproduced.

When moving images other than the moving images of the surroundings of the vehicle 103 are reproduced, the following application example is given. Specifically, the technical structure of the present disclosure may be applied to a system that reproduces a combined moving image combined from moving images captured by a plurality of security cameras, and that displays a desired position by an individual image according to a user's operation.

(3c) The above first embodiment exemplifies a structure in which when an input operation is performed on the touch panel 5 that displays the combined moving image 101, an individual moving image is displayed on the touch panel 5.

However, for example, the display device that displays the combined moving image 101 and the display device that displays the individual moving image may be different. The user can thereby visually recognize the combined moving image 101 and the individual moving image at the same time. In the case of such a structure, two or more display devices correspond to the technical structure of the present disclosure.

(3d) The above first embodiment exemplifies a structure in which the four cameras 3 are placed in the front, rear, left, and right of the vehicle 103, but it is not limited thereto. That is, the installation positions of the cameras and the number of cameras installed are not limited to the structure of the above embodiment. The plurality of cameras may be set at different positions or angles so that at least some of them can capture different areas. Moreover, the cameras are not limited to those having a structure of capturing the entire surroundings of the vehicle 103. For example, the structure may be such that a plurality of cameras is placed so as to capture only the front, left, and right of the vehicle 103, or only the rear, left, and right of the vehicle 103.

(3e) The above first embodiment exemplifies a structure in which the combined moving image 101 with one viewpoint combined from moving images captured by the four cameras 3 is displayed, but it is not limited thereto. The combined moving image 101 may not be a moving image with one viewpoint.

Figure 12:
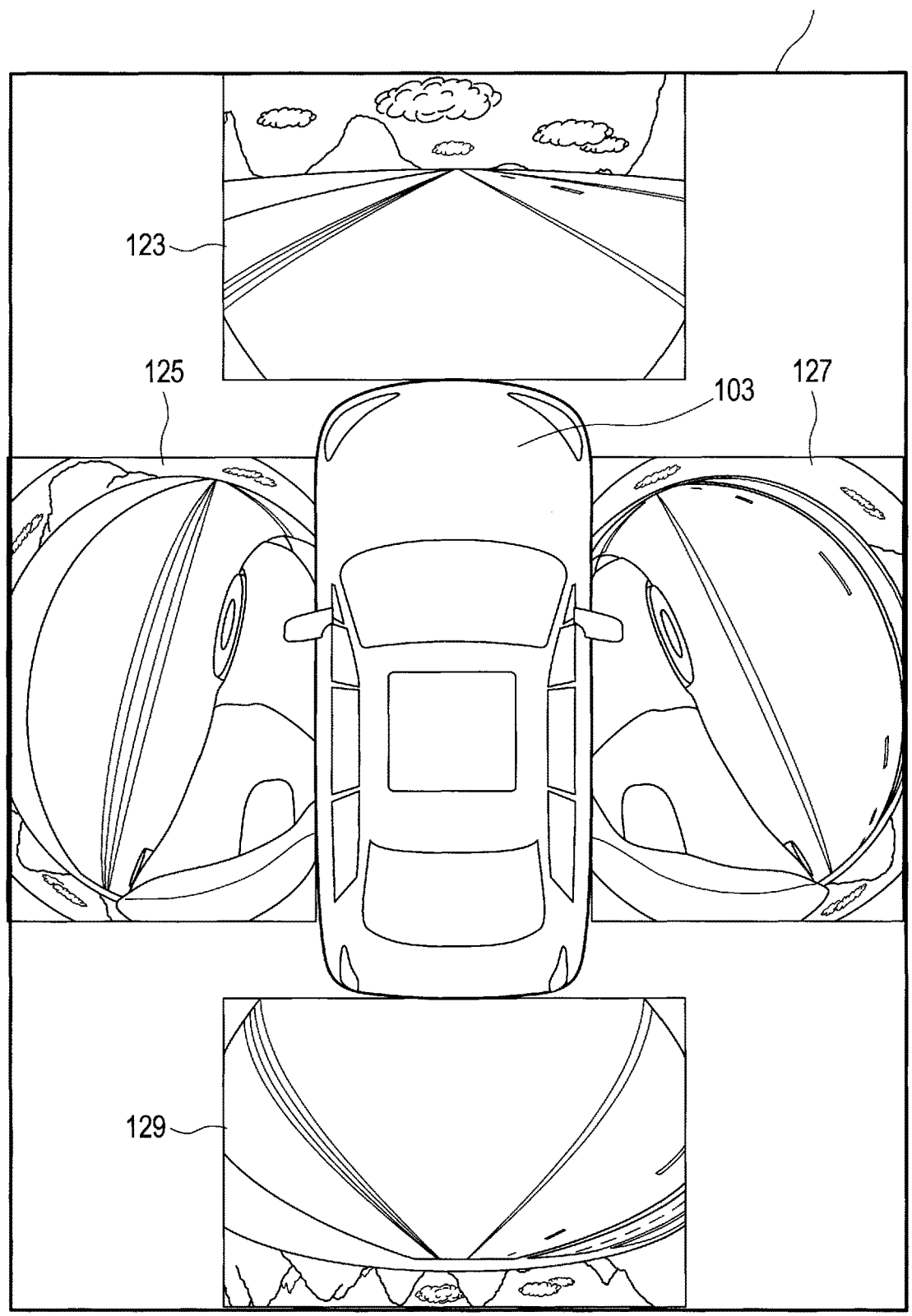
FIG. 12 is a diagram showing a combined moving image of another embodiment.

For example, FIG. 12 shows an example of a combined moving image 151 combined from moving images captured by the cameras 3 in positions corresponding to the photographing directions of the cameras 3, while centering on the vehicle 103. In the combined moving image 151, when any of a front image 123, a left image 125, a right image 127, and a rear image 129 is touched, the touched moving image is displayed in an enlarged scale. Even in such a structure, the user can reproduce a desired individual moving image at any timing.

(3f) The above first embodiment exemplifies a structure in which an individual moving image is displayed according to an input operation on the touch panel 5. Moreover, the above second embodiment exemplifies a structure in which the viewpoint of the combined moving image 141*a* is changed according to an input operation on the touch panel 5. However, the display moving image is not limited to the examples of the above embodiments. The display moving image may be configured such that when an input operation is performed on the touch panel 5, a moving image in a display mode different from the combined moving image 101 is displayed. Therefore, the display moving image contains moving images in various display modes based on the moving images constituting the combined moving image 101.

The display mode means a state of being visually recognized as a moving image. However, the display mode as mentioned herein excludes the contents themselves indicated by the original moving images captured by the cameras 3. That is, the moving images in different display modes mean moving images in which the state of the displayed moving images is partially or completely different, except for changes in the contents of the moving images due to changes with time in the captured object. The state as mentioned herein refers to changes in the original moving images constituting the moving image, changes in viewpoints, enlargement and contraction, changes in brightness and color, change between display and non-display, emphasis presentment, etc.

(3g) The function of one component in the above embodiments may be implemented by a plurality of components. The functions of a plurality of components may be implemented by one component. Some of the structures of the above embodiments may be omitted. Moreover, at least some of the structures of the above embodiments may be added or replaced by the structures of the above other embodiments. The technical embodiment of the present disclosure includes various embodiments based on the technical idea specified only by the wording described in the claims.

(3h) The technique of the present disclosure can be realized in the following forms. Specific examples thereof include a system comprising the ECU 7 as a component, a program for allowing a computer to function as the ECU 7, a recording medium (non-transitory computer-readable storage medium), such as a semiconductor memory, storing the program, and the like.

REFERENCE SIGNS LIST

1 . . . Display processing system
5 . . . Touch panel
7 . . . ECU
31 . . . Moving image generation unit
33 . . . Display control unit
35 . . . input detection unit
37 . . . Image combining unit
101 . . . Combined moving image
121 . . . Front-left image
123 . . . Front image
125 . . . Left image
127 . . . Right image
129 . . . Rear image 141a, 141b . . . Three-dimensional view moving image
151 . . . Combined moving image

The invention claimed is:

1. A display processing device comprising:
 a moving image generator generating a combined moving image that is a moving image combined from a plurality of moving images,
 a display controller a display device capable of displaying a moving image to display a moving image, and
 an input detector detecting an input operation performed on the input device that receives the input operation for inputting at least one of a position on the combined moving image displayed on the display device and a direction based on the combined moving image;
 wherein the display controller allows the display device to display a moving image that is based on, among the plurality of moving images constituting the combined moving image, one or more moving images according to the input detected by the input detector, and that has a display mode different from at least the combined moving image, and
 the display controller is further configured to display the moving image that has a display mode different from the combined moving image from a reproduction position earlier than a reproduction position in which the moving image has been displayed based on the input operation being detected by the input detector.

2. The display processing device according to claim 1, wherein the display controller allows the display device to display an individual moving image that is a moving image based on, among the plurality of moving images, one or more moving images constituting part of the combined moving image according to the input detected by the input detector.

3. The display processing device according to claim 2, wherein the display processing device comprises an image combiner combining, among the plurality of moving images, two or more moving images selected on the basis of the input detected by the input detector, and
 the individual moving image contains a combined moving image combined by the image combiner.

4. The display processing device according to claim 2, wherein in the combined moving image, a region corresponding to each of the plurality of moving images constituting the combined moving image is set on the combined moving image,
 the input device is configured to be able to receive the input operation for inputting the position on the combined moving image, and
 the individual moving image is a moving image based on, among the plurality of moving images, one or more moving images corresponding to the position detected by the input detector.

5. The display processing device according to claim 1, wherein the plurality of moving images is captured by a plurality of cameras mounted in a vehicle.

6. A display processing method in a display processing device, the method comprising:
 a moving image generation step of generating a combined moving image that is a moving image combined from a plurality of moving images,
 a display control step of allowing a display device capable of displaying a moving image to display a moving image, and
 an input detection step of detecting an input operation performed on the input device that receives the input operation for inputting at least one of a position on the combined moving image displayed on the display device and a direction based on the combined moving image;
 wherein the display control step allows the display device to display a moving image that is based on, among the plurality of moving images constituting the combined moving image, one or more moving images according to the input detected by the input detection step, and that has a display mode different from at least the combined moving image, and
 the display control step further displays the moving image that has a display mode different from the combined moving image from a reproduction position earlier than a reproduction position in which the moving image has been displayed from a timing following the input operation being detected by the input detection step.

* * * * *